US012775187B2

(12) United States Patent
Yang et al.

(10) Patent No.: US 12,775,187 B2
(45) Date of Patent: Oct. 27, 2026

(54) DISPLAY PANEL AND MANUFACTURING METHOD THEREFOR, AND DISPLAY DEVICE

(71) Applicants: Ordos Yuansheng Optoelectronics Co., Ltd., Ordos (CN); BOE Technology Group Co., Ltd., Beijing (CN)

(72) Inventors: Yuanhang Yang, Beijing (CN); Fengguo Wang, Beijing (CN); Yezhou Fang, Beijing (CN); Yongsheng Li, Beijing (CN); Zhen Shi, Beijing (CN); Guojiang Yu, Beijing (CN)

(73) Assignees: ORDOS YUANSHENG OPTOELECTRONICS CO., LTD., Inner Mongolia (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 163 days.

(21) Appl. No.: 18/861,589

(22) PCT Filed: May 29, 2023

(86) PCT No.: PCT/CN2023/096915

§ 371 (c)(1),
(2) Date: Oct. 30, 2024

(87) PCT Pub. No.: WO2023/231983

PCT Pub. Date: Dec. 7, 2023

(65) Prior Publication Data

US 2025/0341745 A1 Nov. 6, 2025

(30) Foreign Application Priority Data

May 30, 2022 (CN) ........................ 202210600595.9

(51) Int. Cl.
*G02F 1/1339* (2006.01)
*G02F 1/1335* (2006.01)
*G02F 1/1362* (2006.01)

(52) U.S. Cl.
CPC ...... *G02F 1/1339* (2013.01); *G02F 1/133514* (2013.01); *G02F 1/13396* (2021.01); *G02F 1/1362* (2013.01)

(58) Field of Classification Search
CPC ........................... G02F 1/1339; G02F 1/13396
(Continued)

(56) References Cited

U.S. PATENT DOCUMENTS

2015/0316800 A1* 11/2015 Chen ..................... G02F 1/1339 349/122
2021/0356781 A1* 11/2021 Wang ................ G02F 1/133305
2025/0155753 A1* 5/2025 Lim ...................... G02F 1/1339

FOREIGN PATENT DOCUMENTS

CN 101236334 A 8/2008
CN 109188789 A 1/2019
(Continued)

OTHER PUBLICATIONS

International Search Report mailed on Aug. 29, 2023, received for PCT Application PCT/CN2023/096915, filed on May 29, 2023, 4 pages including English Translation.
(Continued)

*Primary Examiner* — Christopher M Raabe
(74) *Attorney, Agent, or Firm* — XSENSUS LLP

(57) ABSTRACT

The present disclosure relates to a display panel and a manufacturing method therefor, and a display device. The display panel includes an array substrate and a color filter substrate, which are aligned for forming a cell, wherein the array substrate and the color filter substrate are bonded together by means of sealants, which include first sealants
(Continued)

arranged around an edge of the display panel, and a second sealant arranged on an inner side of the first sealant and connected to the first sealants; the second sealant divides a plastic frame formed by the first sealants into a plurality of plastic frame areas; the plurality of plastic frame areas are attached to the array substrate and the color filter substrate to define a plurality of accommodating spaces; and each accommodating space is filled with a liquid crystal layer.

16 Claims, 2 Drawing Sheets

(58) Field of Classification Search
USPC .......................................................... 349/153
See application file for complete search history.

(56) References Cited

FOREIGN PATENT DOCUMENTS

| | | | | | |
|---|---|---|---|---|---|
| CN | 114935856 | A | | 8/2022 | |
| JP | 2017219700 | A | | 12/2017 | |
| JP | 2018049138 | A | | 3/2018 | |
| KR | 20160001794 | A | * | 1/2016 | ......... G02F 1/13394 |

OTHER PUBLICATIONS

Written Opinion mailed on Aug. 29, 2023, received for PCT Application PCT/CN2023/096915, filed on May 29, 2023, 9 pages including English Translation.

* cited by examiner

DISPLAY PANEL AND MANUFACTURING METHOD THEREFOR, AND DISPLAY DEVICE

CROSS-REFERENCE TO RELATED APPLICATIONS

The present disclosure is a U.S. National Stage of International Application No. PCT/CN2023/096915, filed on May 29, 2023, which claims priority to Chinese patent application number 202210600595.9 filed on May 30, 2022, entitled "Display panel, manufacturing method therefor, and display device", and both of which are incorporated herein by reference in their entireties for all purposes.

TECHNICAL FIELD

The present disclosure relates to the field of display technology, and in particular to a display panel and a manufacturing method therefor, and a display device.

BACKGROUND

As the application scenarios of AR/VR products continue to expand, the demand for high PPI (pixels per inch) and high-quality VR products has become increasingly prominent. In VR products with high PPI display, since VR products with a single-screen design and a single substrate exhibit lower edge efficiency, adopting a dual-screen design with a single display panel for traditional VR products can enhance efficiency, that is, dividing the display panel into two sub-screens, the upper screen and the lower screen, for display.

However, when the display panel of the VR product is designed with split screens, as shown in FIG. 1, the design uniformity of the truncated cone-shaped support body (Array Smart PS) in the display panel is poor, which can easily cause differences in the liquid crystal gap between the upper and lower screens. In particular, after the array substrate and the color film substrate are arranged oppositely, the liquid crystal molecules will flow in the liquid crystal cell under the action of atmospheric pressure and gather near the support body, resulting in poor uniformity of the liquid crystal gap within the cell, which in turn leads to poor product brightness uniformity, poor display parameters and other optical defects.

It should be noted that the information disclosed in the above background technology section is only used to enhance the understanding of the background of the present disclosure, and therefore may include information that does not constitute prior art known to those skilled in the art.

SUMMARY

The embodiments of the present disclosure provide a display panel and a manufacturing method therefor, and a display device, which can solve the above-mentioned problems in the prior art.

According to one of solutions of the present disclosure, there is provided a display panel, including:

- a display panel, including an array substrate and a color film substrate arranged oppositely, where the array substrate and the color film substrate are bonded together by a sealant, the sealant includes a first sealant arranged around an edge of the display panel and a second sealant arranged on an inner side of the first sealant and connected to the first sealant, the second sealant divides a sealant frame formed by the first sealant into a plurality of sealant frame areas, the plurality of sealant frame areas are bonded with the array substrate and the color film substrate to form a plurality of accommodating spaces, each of the accommodating spaces is filled with a liquid crystal layer.

According to one of the solutions of the present disclosure, there is provided a method for manufacturing a display panel, including:

- coating a first sealant and a second sealant on a color film substrate to form a plurality of sealant frame areas, where the first sealant is coated around an edge of the color film substrate, and the second sealant is coated on the inner side of the first sealant and connected to the first sealant;
- dripping liquid crystal on the array substrate; and
- arranging the color film substrate and the array substrate oppositely, and bonding them together through the first sealant and the second sealant.

According to one of the solutions of the present disclosure, there is provided a display device, including the display panel described above.

It should be understood that the above general description and the detailed description below are only exemplary and explanatory, and cannot limit the present disclosure.

BRIEF DESCRIPTION OF THE DRAWINGS

The drawings herein are incorporated into the specification and constitute a part of the specification, showing embodiments consistent with the present disclosure, and are used together with the specification to explain the principles of the present disclosure. Obviously, the drawings described below are only some embodiments of the present disclosure. For those skilled in the art, other drawings can also be obtained based on these drawings without inventive work.

REFERENCE NUMERALS

1—array substrate, 11—first support column; 2—color film substrate, 21—second support column; 31—first sealant, 32—second sealant; 4—accommodating space; 5—liquid crystal layer; 6—dummy area; 7—black matrix, 71—BM groove; 10—display panel.

DETAILED DESCRIPTION

Various schemes and features of the present disclosure are described herein with reference to the accompanying drawings.

It should be understood that various modifications may be made to the embodiments applied herein. Therefore, the above description should not be regarded as limiting, but only as an example of the embodiments. Other modifications within the scope and spirit of the present disclosure will occur to those skilled in the art.

The accompanying drawings, which are included in and constitute a part of the specification, illustrate embodiments of the present disclosure and are used together with the general description of the present disclosure given above and the detailed description of the embodiments given below to explain the principles of the present disclosure.

These and other features of the present disclosure will become apparent from the following description of preferred forms of embodiments given as non-limiting examples with reference to the accompanying drawings.

It should also be understood that although the present disclosure has been described with reference to some specific examples, those skilled in the art will be able to implement many other equivalent forms of the present disclosure with certainty.

The above and other aspects, features and advantages of the present disclosure will become more apparent in view of the following detailed description when combined with the accompanying drawings.

Specific embodiments of the present disclosure are described hereinafter with reference to the accompanying drawings; however, it should be understood that the embodiments applied for are merely examples of the present disclosure, which may be implemented in a variety of ways. Well-known and/or repeated functions and structures are not described in detail to avoid obscuring the present disclosure with unnecessary or redundant details. Therefore, the specific structural and functional details applied in this article are not intended to be limiting, but are only used as the basis and representative basis of the claims to teach those skilled in the art to use the present disclosure in a variety of ways with substantially any appropriate detailed structure.

Figure 2:
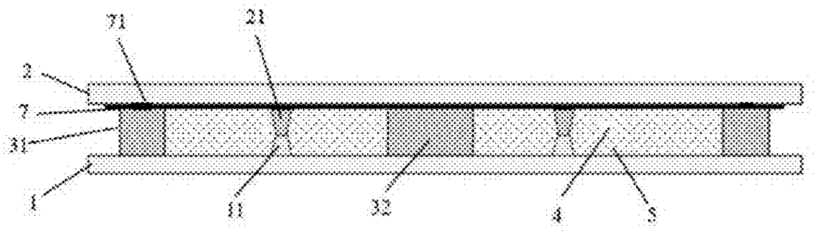
FIG. 2 shows a side view structure diagram of a display panel of an embodiment of the present disclosure.
Figure 3:
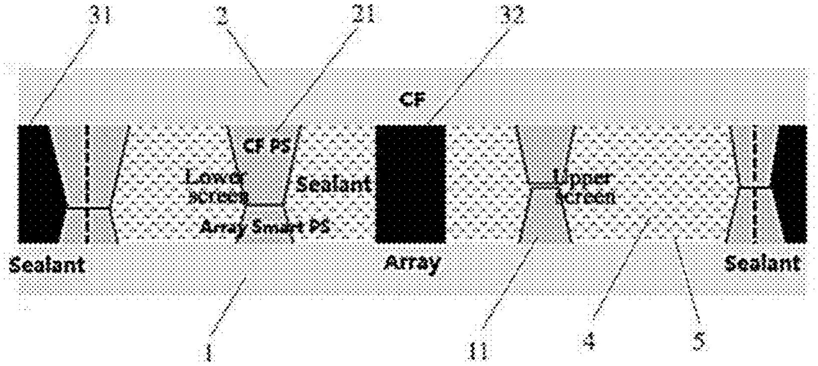
FIG. 3 shows another side view structure diagram of a display panel of an embodiment of the present disclosure.
Figure 4:
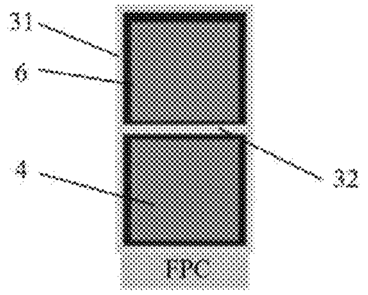
FIG. 4 shows a top view structure diagram of a display panel of an embodiment of the present disclosure.

FIGS. 2 to 4 show schematic diagrams of structures of a display panel of an embodiment of the present disclosure. As shown in FIGS. 2 to 4, an embodiment of the present disclosure provides a display panel, including an array substrate (TFT) 1 and a color film substrate (CF) 2 arranged oppositely. The array substrate 1 and the color film substrate 2 are bonded together by a sealant. The sealant includes a first sealant 31 arranged around the edge of the display panel and a second sealant 32 arranged on the inner side of the first sealant 31 and connected to the first sealant 31. The second sealant 32 divides the sealant frame formed by the first sealant 31 into a plurality of sealant frame areas. The plurality of sealant frame areas are bonded with the array substrate 1 and the color film substrate 2 to form a plurality of accommodating spaces 4, each of which is filled with a liquid crystal layer 5.

Specifically, in conventional display panel design, the sealant design is determined based on the layout of the display panel periphery. Since the peripheral design of special-shaped sealant products is different from that of conventional mobile phones and vehicle-mounted equipment, which only require the sealant to be sealed on the periphery of the panel, when VR products require split-screen display, in order to meet customer needs and peripheral design placement requirements, the peripheral sealant is usually made into a special-shaped structure, and the sealant is interconnected to form a structural model of liquid crystal overall drive. In this design, the liquid crystal molecules flow between the upper and lower screens and gather at a position where the overall thickness of the support body (the sum of the thickness of the array substrate support body and the color film substrate support body) is higher, resulting in poor uniformity of the bottom film layer under the action of atmospheric pressure. The above design does not take into account the obvious difference in optical uniformity between the upper and lower screens caused by the interaction between the bottom film layer structure of VR products and atmospheric pressure, and is prone to various environmental reliability-related defects (NG), such as liquid crystal puncture contamination, high-temperature peripheral yellowing, etc.

In the display panel provided by the embodiment of the present disclosure, by providing a second sealant 32 connected to the first sealant 31 on the inner side of the first sealant 31 surrounding the edge of the display panel, the sealant frame formed by the first sealant 31 is divided into multiple sealant frame areas. The multiple sealant frame areas are bonded with the array substrate 1 and the color film substrate 2 to form multiple independent accommodating spaces 4 for filling the liquid crystal layer 5, which can effectively isolate the interaction of liquid crystal (LC) molecules in different accommodating spaces 4. At the same time, with the supporting effect of the second sealant 32 between the array substrate 1 and the color film substrate 2, it can improve the uneven liquid crystal volume, uneven liquid crystal gap (Cell Gap) in the liquid crystal cell and other optical defects caused by the difference in film layers of different screens due to the atmospheric pressure for the display device product with split-screen display, and ensure the high-specification display of display device products such as VR products while solving the optical reliability problem of the upper and lower screens of the product, and improve the optical performance of the product.

The second sealant 32 described in the present disclosure is arranged on the inner side of the first sealant 31, which can be understood as that the orthographic projection of the second sealant 32 on the array substrate is located within the area covered by the orthographic projection of the first sealant 31 on the array substrate.

In this embodiment, the second sealant 32 is arranged between two first sealants 31 opposite to each other in the longitudinal direction, and is connected to the two first sealants 31 opposite to each other in the longitudinal direction.

The shape of the display panel is usually rectangular. The first sealant 31 arranged around the edge of the display panel includes a sealant arranged longitudinally (along the length direction of the display panel) and a sealant arranged transversely (along the width direction of the display panel), and the sealant arranged longitudinally and the sealant arranged transversely are bonded to form a seal frame. In order to facilitate screen splitting, the display panel is usually divided into at least two screens along the longitudinal direction (crosswise cutting). Therefore, in order to correspond to each screen after the screen splitting, a second sealant 32 is provided between the two first frame sealants 31 opposite to each other in the longitudinal direction to divide the sealant frame into multiple sealant frame areas, and the multiple sealant frame areas are bonded with the array substrate 1 and the color film substrate 2 to form multiple independent accommodating spaces 4 for filling the liquid crystal layer 5, and the accommodating space 4 is the liquid crystal cell. In this embodiment, in addition to setting the sealant at the edge of the display panel, the sealant is also set in the middle of the display panel to form multiple independently sealed liquid crystal cells to prevent the liquid crystal from flowing between different liquid crystal cells, and the supporting effect of the second sealant 32 is used to reduce the effect with the atmospheric pressure, so as to improve the optical uniformity of the display panel. In this embodiment, the setting position of the second sealant 32 is determined according to the split screen position.

In other embodiments, the display panel can also be cut longitudinally to be divided into at least two screens. Accordingly, the second sealant 32 is set along the lateral direction of the display panel to match at least two screens.

In this embodiment, as shown in FIG. 4, the second sealant 32 is one, and the sealant frame formed by the first sealant 31 is divided into two sealant frame areas, so as to be bonded with the array substrate 1 and the color film substrate 2 to form two closed accommodating spaces 4. The display panel is divided into an upper screen and a lower screen, where the upper screen is the screen near the top of the display panel (DO side), and the lower screen is the screen near the bottom of the display panel (near the integrated circuit binding area FPC) (DP side). The second sealant 32 can form a structure with consistent upper and lower bottom spaces to ensure the optical uniformity of the upper and lower screens.

In addition, in this embodiment, the whole sealant frame is directly divided into a plurality of sealant frame areas by the second sealant 32 arranged on the inner side of the first sealant 31 and connected to the first sealant 31. Compared with setting the sealant frame areas around the edges of each split screen, the sealant coating time can be effectively shortened, and the area of the entire screen display area can be increased (there is a gap between adjacent sealant frame areas when they are set separately), ensuring the uniformity of the entire screen display.

In other embodiments, multiple second sealants 32 can be arranged at intervals along the longitudinal direction of the display panel according to the needed number of split screens. For example, the display panel includes three display screen areas, namely, the upper screen, the middle screen and the lower screen. Therefore, two second sealants 32 can be arranged at intervals along the longitudinal direction of the display panel to form three liquid crystal layer areas.

In some embodiments, the volume of each accommodating space 4 is the same, and each accommodating space 4 is filled with an equal amount of liquid crystal to form multiple uniform display areas, thereby ensuring the optical uniformity of different display areas, solving the problem of uneven liquid crystal gap during dual-screen display, and improving the optical performance of the product.

In other embodiments, the volume of each accommodating space 4 can be different, as long as the pixel density after filling with liquid crystal is the same, thereby ensuring the optical uniformity of different display areas.

In some embodiments, the width of the second sealant 32 is greater than the width of the first sealant 31, so that the second sealant 32 can form a stable support between the array substrate 1 and the color film substrate 2, avoiding various optical defects caused by the interaction between the bottom film layer structure of the array substrate 1 and the color film substrate 2 and the atmospheric pressure.

It is worth noting that the width of a certain sealant described in the present disclosure can be understood as that the orthographic projection of the sealant on the array substrate has a first side and a second side opposite to each other, and a straight line passing through any first node on the first side and perpendicular to the extension direction of the first side intersects with the second side at the second node, and the distance between the first node and the second node is the width of the sealant. In particular, when the first side is not a straight line, a straight line passing through any first node on the first side and tangent to the first side can intersect with the second side at the second node, and the distance between the first node and the second node is the width of the sealant.

In some embodiments, the first sealant 31 and the second sealant 32 are coated on the color film substrate 2. Since the liquid crystal is usually dripped on the array substrate 1, in this embodiment, the color film substrate 2 and the array substrate 1 can be used for sealant coating and liquid crystal dripping, respectively, to improve the processing efficiency of the display panel.

In some embodiments, as shown in FIG. 4, the accommodating space 4 filled with the liquid crystal layer 5 forms a display area (AA area), and a dummy area 6 is arranged around the periphery of the display area, and the sealant frame area is arranged around the periphery of the dummy area 6. In this embodiment, the sealant frame area is set outside the dummy area 6, and the dummy pixels of the dummy area 6 can be connected to the pixels (such as OLED pixels) in the display area through wirings for optical matching to ensure reliable display of the display area.

In some embodiments, as shown in FIG. 2 and FIG. 3, at least one first support column 11 (Array SMT PS) is provided on the side of the array substrate 1 facing the color filter substrate 2. At least one second support column 21 (CF PS) is provided on the side of the color filter substrate 2 facing the array substrate 1, and the at least one second support column 21 is connected to the first support column 11 one by one. At least one group of first support columns 11 and second support columns 21 connected to each other is provided in each accommodating space 4, so that stable support can be formed when the bottom film layer structure of the array substrate 1 and the color filter substrate 2 interacts with the atmospheric pressure, preventing the morphology of each accommodating space 4 from changing, ensuring the uniformity of the liquid crystal gap in each accommodating space 4, and further improving the optical performance of the display panel.

As shown in FIG. 2, the display panel also includes a black matrix (BM) 7 arranged above the liquid crystal layer 5 to prevent light leakage at the edge of the pixel; and a BM groove 71 provided on the black matrix 7 at a position corresponding to the first sealant frame 31 to solve the problem of static electricity transmission.

The display panel provided in the embodiment of the present disclosure uses the second sealant 32 disposed in the middle of the array substrate 1 and the color film substrate 2 to seal the sub-screen internally, thereby improving the optical uniformity of different sub-screens (upper screen and lower screen) of the split-screen VR product, ensuring the consistency of the space in the liquid crystal cells of different sub-screens, ensuring the same amount of liquid crystal dripped into the liquid crystal cells of different sub-screens, and improving the uniformity of the liquid crystal gap of the product.

The liquid crystal gap performance test shows that the average level of the liquid crystal gap difference of the interconnected structure inside the sealant is 0.07 μm, while after the second sealant 32 is set in this embodiment to form an independently closed liquid crystal cell, the average level of the liquid crystal gap difference is 0.02 μm. This embodiment can improve the uniformity of the liquid crystal gap by about 150% (the average value calculated by taking the absolute value of the difference between the liquid crystal gaps of the upper and lower screens is the relative difference between the liquid crystal gaps of the upper and lower screens), and the yield of the improved product can be improved by 11.1%. In this embodiment, the sealant frame formed by the first sealant 31 is divided into a plurality of independently closed sealant frame areas by the second sealant 32, and the liquid crystal molecules are all filled into their respective corresponding positions when the cell is assembled, which can improve the optical uniformity of the upper and lower screens of the product. It is also proved by the optical performance test that the average level of the L127 brightness difference of the interconnected structure inside the sealant is 2.5%, while the average level of the L127 brightness difference in this embodiment is 0%. After the sealant isolates the flow of liquid crystal molecules (the brightness difference between the upper and lower screens is within 3% in the FOG state), the design uniformity is improved by 18.87%. The present disclosure uses the second sealant 32 at the split screen position to separate the liquid crystal interaction between the upper screen and the lower screen, significantly improving the uniformity of the liquid crystal gap within the cells of the upper screen and the lower screen, thereby greatly improving the optical reliability of the product and improving the poor optical reliability of the split-screen VR product.

The present disclosure also provides a method for manufacturing a display panel, including:

- S101: coating a first sealant 31 and a second sealant 32 on a color film substrate 2 to form a plurality of sealant frame areas, where the first sealant 31 is coated around the edge of the color film substrate 2, and the second sealant 32 is coated on the inner side of the first sealant 31 and connected to the first sealant 31;
- S102: dripping liquid crystal on the array substrate 1;
- S103: arranging the color film substrate 2 and the array substrate 1 oppositely, and bonding them together through the first sealant 31 and the second sealant 32.

Specifically, an array substrate 1 and a color filter substrate 2 are first provided. The array substrate 1 and the color filter substrate 2 can be transparent substrates such as glass substrates, quartz substrates and plastic substrates. In this embodiment, the array substrate 1 is preferably a glass substrate.

Figure 5:
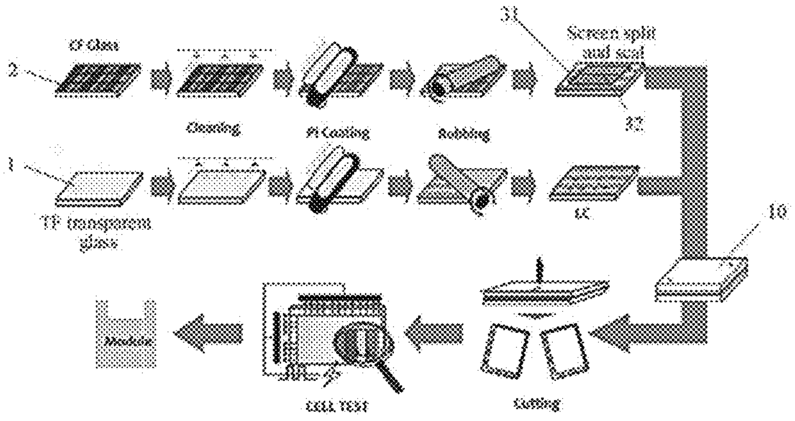
FIG. 5 shows a processing diagram of a display panel of an embodiment of the present disclosure.

As shown in FIG. 5, after the PP-Clean unit is normally passed in the ODF (One Drop Filling) process of the liquid crystal process, dispense pattern of the sealant onto the color filter substrate 2. The dispensing start end of the sealant of the SED unit is set on the DP side. Two longitudinally opposite first sealants 31 and a lateral first sealant 31 are dispensed from the DP side through the SED process (the SED needle is completed in one stroke), forming a sealant frame with an opening, and then the second sealant 32 is dispensed at the split screen position (middle position), and then the lateral first frame glue 31 is dispensed on the DO side to seal the sealant, forming two accommodating spaces 4 with the same bottom area of the upper and lower split screens. After dispensing the sealant, the sealant is coated onto the color film substrate 2. When the liquid crystal is assembled, the sealant fully covers the dummy area 6 of the color film substrate 2. The same mass of liquid crystal is dripped into the upper and lower screens of the array substrate 1. The liquid crystal pattern (LC Pattern) is small droplets to prevent liquid crystal puncture. The first sealant 31 and the second sealant 32 are coated onto the color film substrate 2. After the liquid crystal is dripped onto the array substrate 1, the array substrate 1 and the color film substrate 2 are bonded. Finally, the bonded array substrate 1 and the array substrate 1 are cured at high temperature to cure the sealant into a cell to form a complete display panel 10. After the cell is assembled, the liquid crystal slowly diffuses in the corresponding accommodating space 4.

Figure 1:
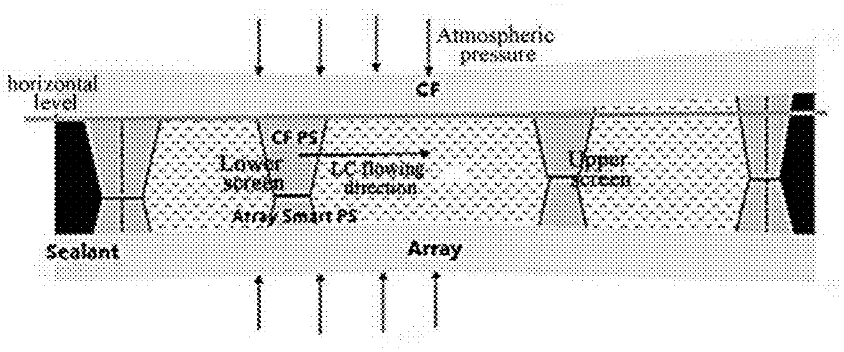
FIG. 1 shows a side view structure diagram of a display panel of the prior art.

The display panel provided by the embodiment of the present disclosure is mainly suitable for VR products with upper and lower split screens. For example, in order to pursue better VR optical performance, the height of the support column is reduced to the limit in the B6 VR product. However, due to the influence of the process related to the first support column 11, the uniformity level of the overall support column cannot be effectively improved to produce high-requirement VR split screen products (as shown in FIG. 1). Therefore, different accommodating spaces 4 are obtained through the above steps S101 to S103, and the overall uniformity level of the display panel is improved by utilizing the supporting effect of the second sealant 32 between the array substrate 1 and the color film substrate 2, thereby improving its optical performance.

Preferably, the first sealant 31 is coated from the lower edge of the color film substrate 2. According to the sealant frame area formed after the above-mentioned dispensing pattern of the sealant, the side edge at the DP side (lower side) of the color film substrate 2 is used as the start edge, and the first sealant 31 is coated sequentially along the start edge to the other side edges, and the second sealant 32 is coated after the first sealant 31 being coated to the position of the second sealant 32. Finally, the second sealant 32 is coated onto the side edge located on the DO side, so as to ensure the uniformity of the coating of each sealant, and the sealants can be overlapped and coated at the connection between the first sealant 31 and the second sealant 32, so as to ensure the stable support of the second sealant 32 to the array substrate 1 and the color film substrate 2. In this embodiment, the first sealant 31 is coated from the lower edge of the color film substrate 2, and then the second sealant 32 is coated, and finally the first sealant 31 is coated onto the upper edge of the color film substrate 2 for sealing and closing, which can effectively shorten the time of coating the sealant and ensure uniform coating of the sealant. At the same time, as shown in FIG. 4, since the space of the lower edge area of the color film substrate 2 is large (for arranging FPC, etc.), the side edge at the DP side is used as the start edge of the coating, and the amount of sealant coated can be adjusted in time to avoid uneven coating caused by sudden sealant discharge.

In the specific implementation, since the widths of the first sealant 31 and the second sealant 32 are different, the second sealant 32 can also be coated onto the inner side of the first sealant 31 after the first sealant 31 is fully coated.

As shown in FIG. 5, other manufacturing processes of the display panel, such as non-photosensitive negative polyimide material coating (PI coating) and rubbing, can refer to the prior art and will not be repeated here.

The embodiment of the present disclosure also provides a display device, including the above-mentioned display panel. The display device is a display device capable of dual-screen or multi-screen display, and an example of the display device is a liquid crystal display device. The display device can be any product or component with a display function, such as a mobile phone, a tablet computer, a television, a monitor, a laptop computer, a wearable watch, a navigator, etc.

The method for manufacturing a display panel and the display device provided in the embodiment of the present disclosure correspond to the display panel of the above embodiment, and any optional items in the display panel embodiment are also applicable to the method for manufacturing a display panel and the embodiment of the display device, which will not be repeated here.

The above embodiments are only example embodiments of the present disclosure and are not intended to limit the present disclosure. The scope of protection of the present disclosure is defined by the claims. Those skilled in the art may make various modifications or equivalent substitutions to the present disclosure within the essence and scope of protection of the present disclosure, and such modifications or equivalent substitutions should also be deemed to fall within the scope of protection of the present disclosure.

What is claimed is:

1. A display panel, comprising an array substrate and a color film substrate arranged oppositely, wherein the array substrate and the color film substrate are bonded together by a sealant, the sealant comprises a first sealant arranged around an edge of the display panel and a second sealant connected to the first sealant, the second sealant divides a sealant frame formed by the first sealant into a plurality of sealant frame areas, the plurality of sealant frame areas are bonded with the array substrate and the color film substrate to form a plurality of accommodating spaces, each of the accommodating spaces is filled with a liquid crystal layer.

2. The display panel according to claim 1, wherein the second sealant is arranged between two longitudinally opposite first sealants and connected to the two longitudinally opposite first sealants.

3. The display panel according to claim 1, wherein a volume of each of the accommodating spaces is same.

4. The display panel according to claim 1, wherein a width of the second sealant is greater than a width of the first sealant.

5. The display panel according to claim 1, wherein the first sealant and the second sealant are coated on the color film substrate.

6. The display panel according to claim 1, wherein the accommodating space filled with the liquid crystal layer forms a display area, a dummy area is arranged around a periphery of the display area, and the sealant frame areas are arranged around a periphery of the dummy area.

7. The display panel according to claim 1, wherein at least one first support column is arranged on a side of the array substrate facing the color film substrate, at least one second support column is arranged on a side of the color film substrate facing the array substrate, the at least one second support column is connected to the at least one first support column one by one, and at least one group of the first support column and the second support column connected to each other is arranged in each accommodating space.

8. A method for manufacturing a display panel, comprising:

coating a first sealant and a second sealant on a color film substrate to form the plurality of sealant frame areas, wherein the first sealant is coated around an edge of the color film substrate, and the second sealant is connected to the first sealant, the second sealant divides a sealant frame formed by the first sealant into the plurality of sealant frame areas;

dripping liquid crystal on the array substrate; and arranging the color film substrate and the array substrate oppositely, and bonding them together through the first sealant and the second sealant, wherein the plurality of sealant frame areas are bonded with the array substrate and the color film substrate to form a plurality of accommodating spaces, each of the accommodating spaces is filled with a liquid crystal layer.

9. The method for manufacturing the display panel according to claim 8, further comprising:

coating the first sealant from a lower edge of the color film substrate.

10. A display device, comprising the display panel, comprising an array substrate and a color film substrate arranged oppositely, wherein the array substrate and the color film substrate are bonded together by a sealant, the sealant comprises a first sealant arranged around an edge of the display panel and a second sealant connected to the first sealant, the second sealant divides a sealant frame formed by the first sealant into a plurality of sealant frame areas, the plurality of sealant frame areas are bonded with the array substrate and the color film substrate to form a plurality of accommodating spaces, each of the accommodating spaces is filled with a liquid crystal layer.

11. The display device according to claim 10, wherein the second sealant is arranged between two longitudinally opposite first sealants and connected to the two longitudinally opposite first sealants.

12. The display device according to claim 10, wherein a volume of each of the accommodating spaces is same.

13. The display device according to claim 10, wherein a width of the second sealant is greater than a width of the first sealant.

14. The display device according to claim 10, wherein the first sealant and the second sealant are coated on the color film substrate.

15. The display device according to claim 10, wherein the accommodating space filled with the liquid crystal layer forms a display area, a dummy area is arranged around a periphery of the display area, and the sealant frame areas are arranged around a periphery of the dummy area.

16. The display device according to claim 10, wherein at least one first support column is arranged on a side of the array substrate facing the color film substrate, at least one second support column is arranged on a side of the color film substrate facing the array substrate, the at least one second support column is connected to the at least one first support column one by one, and at least one group of the first support column and the second support column connected to each other is arranged in each accommodating space.

* * * * *